(12) United States Patent
Sessions et al.

(10) Patent No.: US 12,410,852 B1
(45) Date of Patent: Sep. 9, 2025

(54) TORQUE FREE ARTICULATED TENSION TRANSMISSION

(71) Applicant: Liftwave, Inc., Somerville, MA (US)

(72) Inventors: Blake Sessions, Boston, MA (US); Toomas Sepp, Somerville, MA (US); Nolan Hobart, Somerville, MA (US); Emily Ann Heidlauf, Newton, MA (US); John Pryor Strauss, Rindge, NH (US)

(73) Assignee: Liftwave, Inc., Somerville, MA (US)

( * ) Notice: Subject to any disclaimer, the term of this patent is extended or adjusted under 35 U.S.C. 154(b) by 0 days.

(21) Appl. No.: 19/176,481

(22) Filed: Apr. 11, 2025

Related U.S. Application Data (60) Provisional application No. 63/673,835, filed on Jul. 22, 2024, provisional application No. 63/633,384, filed on Apr. 12, 2024.

(51) Int. Cl.
*F16H 37/12* (2006.01)
*F16H 19/06* (2006.01)

(52) U.S. Cl.
CPC ... *F16H 37/122* (2013.01); *F16H 2019/0695* (2013.01)

(58) Field of Classification Search
CPC .................. F16H 37/122; F16H 2019/0695
See application file for complete search history.

(56) References Cited

U.S. PATENT DOCUMENTS

| | | | |
|---|---|---|---|
| 4,558,911 A | 12/1985 | Ruoff | |
| 5,207,114 A * | 5/1993 | Salisbury, Jr. | F16H 19/005 74/89.22 |
| 11,255,416 B2 | 2/2022 | Sessions | |
| 11,746,860 B2 | 9/2023 | Sessions et al. | |
| 12,135,072 B1 | 11/2024 | Sessions et al. | |
| 12,209,641 B2 | 1/2025 | Sessions | |

FOREIGN PATENT DOCUMENTS

| | | |
|---|---|---|
| CN | 108698223 B | 11/2022 |
| EP | 2977153 A2 | 1/2016 |
| KR | 20110133307 A | 12/2011 |
| WO | WO 2020/099532 A1 | 5/2020 |

OTHER PUBLICATIONS

International Search Report and Written Opinion in International Appln. No. PCT/US2025/024266, mailed on Jul. 22, 2025, 13 pages.

* cited by examiner

*Primary Examiner* — Terence Boes
(74) *Attorney, Agent, or Firm* — Fish & Richardson P.C.

(57) ABSTRACT

In general, the disclosure involves a joint system and a tension transmission system. The joint system includes a sheave that rotates about an axis, a first tension member at least partially wrapped around the sheave in a first direction creating an angle between the direction of entry of the tension member onto the sheave and the direction of exit of the tension member off the sheave, a roller mounted to the sheave at the axis and configured to roll along a frame, and a second tension member that includes a first end and a second end. The second tension member can be partially wrapped around the roller in a second direction opposite the first direction, and the first end affixed to the roller and the second end affixed to the frame.

20 Claims, 8 Drawing Sheets

TORQUE FREE ARTICULATED TENSION TRANSMISSION

CROSS REFERENCE TO RELATED APPLICATIONS

This application claims priority to U.S. Provisional Application No. 63/633,384, filed Apr. 12, 2024 and U.S. Provisional Application No. 63/673,835, filed Jul. 22, 2024, the entire content of each application is hereby incorporated by references in their entirety

TECHNICAL FIELD

This disclosure generally relates to a compound joint arranged to enable dynamic bend angles in a belt passing over a sheave with minimal tension or length changes. This enables belt driven power transmission within the context of a machine frame that contains one or more points of articulation which create multiple reference frames within the machine. The disclosed solution permits the maintenance of the belt system's true-running path alignment, as well as its relative position and speed, within multiple distinct and moving reference frames of the machine's chassis.

BACKGROUND

Modern belts have many desirable characteristics. They can be lightweight, low-maintenance, and have high strength under tension. Many new and old applications of modern belts are currently being adapted.

SUMMARY

In general, the disclosure involves a joint system and a tension transmission system. The joint system includes a sheave that rotates about an axis, a first tension member at least partially wrapped around the sheave in a first direction creating an angle between the direction of entry of the tension member onto the sheave and the direction of exit of the tension member off the sheave, a roller mounted to the sheave at the axis and configured to roll along a frame, and a second tension member that includes a first end and a second end. The second tension member can be partially wrapped around the roller in a second direction opposite the first direction, with the first end affixed to the roller and the second end affixed to the frame Implementations can include one or more of the following features.

In some instances, a first compression member extends from the frame in the direction of entry and is configured to transmit compression along a path of the first tension member.

In some instances, a second compression member extends from the roller in the direction of the exit and is configured to transmit compression along a path of the first tension member.

In some instances, the roller travels along the frame as the angle created by the first tension member changes.

In some instances, a radius of the sheave and a radius of the roller are selected to minimize a change in length of the first tension member that is present within the joint system when the angle is changed.

In some instances, the roller is a first roller, and the system includes a second roller and a third tension member affixed to the second roller and the frame. The sheave can be positioned between the first roller and the second roller.

In some instances, the first tension member is a flat belt.

In some instances, a fourth tension member is affixed to the roller and the frame, and partially wraps around the roller in the first direction.

In some instances, the joint system includes an axle upon which the roller is affixed and about which the sheave rotates. In some instances, a guide runner is coupled to the axle and configured to translate along the frame. In such instances, the guide runner can affix the axle at a predetermined distance from the frame.

In some instances, the first tension member travels from a drive unit, through the joint system, and to a belt driven linear actuator.

The tension transmission system can include two or more articulating joints, a drive system configured to pay out or withdraw length of belt, a belt driven system, and a belt running from the drive system, through the two or more articulating joints, and to the belt driven system. Each articulating joint can include a sheave configured to rotate about an axis, a belt at least partially wrapped around the sheave in a first direction, creating an angle between the direction of entry of the belt onto the sheave and the direction of exit of the belt off the sheave, a roller mounted to the sheave and configured to roll along a frame and rotate about the axis, and a tension member including a first end and a second end, the tension member partially wrapped around the roller in a second direction opposite the first direction, with first end affixed to the roller and the second end affixed to the frame.

In some instances, each articulating joint provides a first degree of freedom based on changing the angle, and a second degree of freedom based on twisting the belt before entry into the sheave.

In some instances, the tension transmission system includes three articulating joints. A first articulating joint is mounted to the drive system and includes a first compression member extending from the frame of the first articulating joint to the frame of a second articulating joint. The second articulating joint includes a second compression member extending from the roller of the second articulating joint to the frame of a third articulating joint. The third articulating joint is mounted to the belt driven system.

In some instances, the second articulating joint is rotatably coupled to the first and second compression members.

In some instances, the belt driven system is a belt driven linear actuator.

In some instances, the belt is a flat belt rated to transmit at least 27 kN of tension between the drive system and the belt driven system.

In some instances, the drive system and the belt driven system are configured to move relative to one another.

In some instances, each articulating joint includes a guide runner coupled to an axle and configured to translate along the frame affixing the axle at a predetermined distance from the frame. The sheave and roller can be mounted to the axle.

While belt driven power transmission systems have many advantages, one distinct disadvantage is that they are not as simple as electrical cable or fluid power systems when transmitting power between components that move within multiple reference frames. For example, many electrical and hydraulic conduit systems are capable of transmitting very high amounts of power across and arbitrary change in position and rotation that occurs in an articulation point of a machine's frame or chassis. A machine frame articulation point may cause up to three changes in translation (e.g., X, Y, and Z) as well as three changes in rotational position at one end of the flexible conduit relative to the other end.

Electrical and hydraulic conduits tolerate these physical shifts of position and rotation with ease, generally causing no undue damage to any component of the machine frame nor to the aforementioned conduit in a wide variety of circumstances. Electrical and fluid conduits are unique in this regard, with one notable exception: The push-pull cable, also known as a "Bowden" cable. These cable systems can tolerate complex changes of reference frame while transmitting mechanical power across that change of reference frame, with one distinct and sever disadvantage: They rely on sliding friction within the housing and its lining to alter the path of the cable, thus resulting in significant frictional losses as well as severe limitations to the magnitude of power transmission capability. Push-pull cables are widely applied to low power, low-to-high force applications such as bicycle brakes, motorcycle transmission shifting cables, and aircraft engine controls. Each of these applications are low power and convey small position changes to the cable relative to its housing. Push-pull cables are not suitable for continuous, high-power transmission, for example, power transmitted in excess of 100 watts.

This disclosure describes a sheave and joint that enables transmission of tension from a drive system to a driven system that may move relative to the drive system. During movement of the belt driven system or drive system, the overall length of the tensioned member (e.g., cable, belt, rope, etc.) and tension can be maintained, so that the movement does not significantly affect interactions between the drive system and the driven system.

For example, certain belt driven linear actuators use a belt reeved in a block and tackle system to expand or contract, moving objects. In implementations where space constraints require the belt drive system to be remote from the actuator, then redirection sheaves can be used to guide the belt from the drive system to the belt driven linear actuator. However, if the belt driven linear actuator moves relative to the drive system, then those redirection sheaves must be able to adapt to a wide variety of geometries. For example, where the linear actuator is on the end of a robotic arm, or other moving component, while the drive system is fixed, changes in position of the actuator relative to the drive system can cause changes in tension within the belt, and thus inadvertent or unintended motion of the linear actuator. Additionally, as the belt geometry changes between the drive system and the actuator, forces exerted on the redirection sheaves will change, which can cause undesirable movement, torque effects, and belt wear. The belt driven linear actuators described herein can avoid one or more of those undesirable effects.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

To describe technical solutions in the implementations of the present specification or in the existing technology more clearly, the following briefly describes the accompanying drawings needed for describing the implementations or the existing technology. The accompanying drawings in the following descriptions merely show some implementations of the present specification, and a person of ordinary skill in the art can still derive other drawings from these accompanying drawings without creative efforts.

Like reference numbers and designations in the various drawings indicate like elements.

DETAILED DESCRIPTION

This disclosure describes a compound joint arranged to enable dynamic bend angles in belt passing over a sheave with minimal tension or length changes.

Figure 1A:
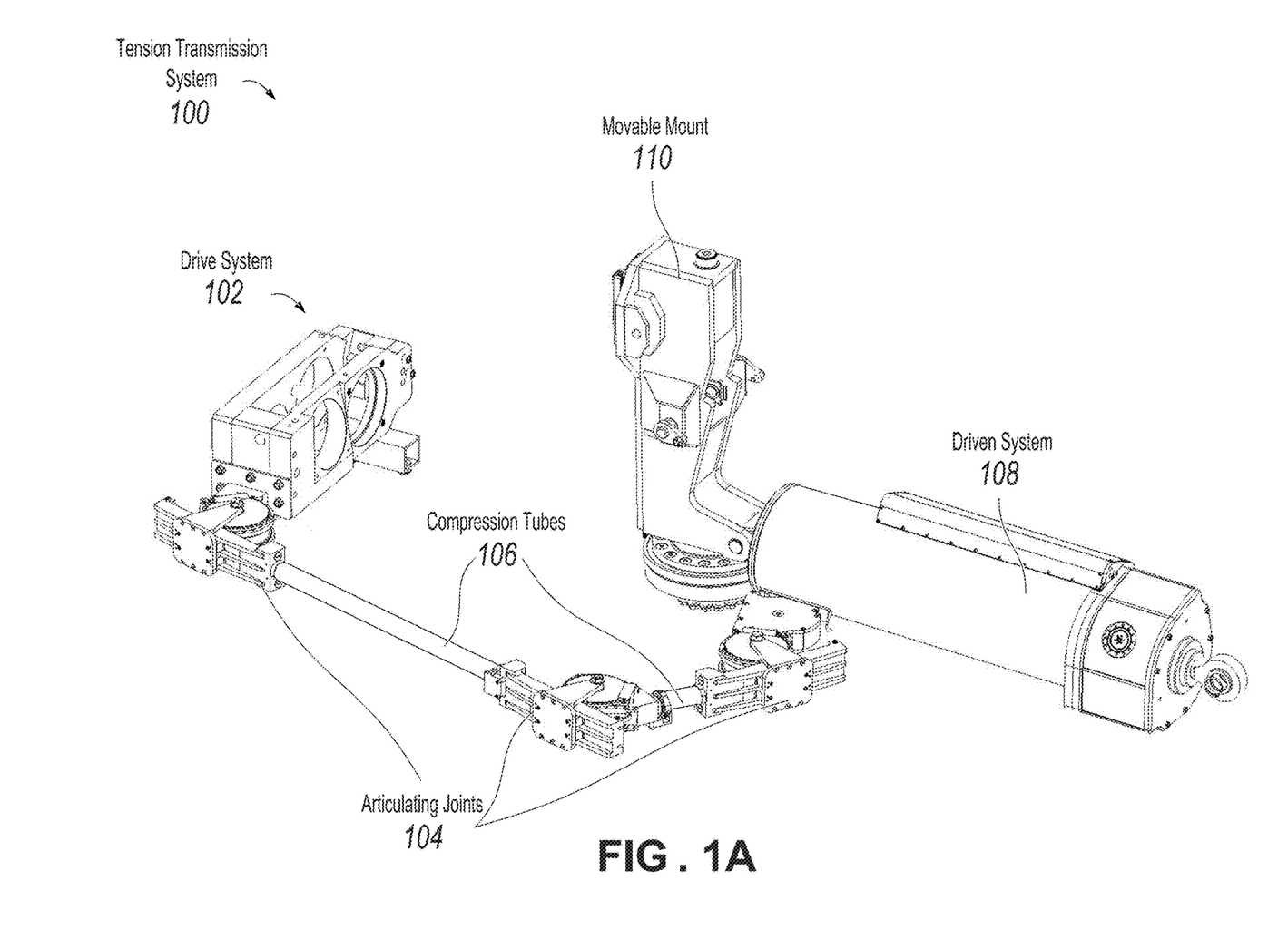
FIG. 1A illustrates a tension transmission system with a driven system in a lowered position.

FIG. 1A illustrates a tension transmission system 100 with a driven system 108 in a lowered position. The tension transmission system 100 includes a drive system 102, articulating joints 104, compression tubes 106, and the driven system 108 coupled to a movable mount 110.

The drive system 102 can be powered from an external power source (e.g., electric, hydraulic, pneumatic, etc.) and can function to withdraw belt from, or pay belt out to the driven system 108. In general, the drive system 102 can include one or more capstans that can be powered to frictionally engage the belt and control belt tension. For example, the belt drive system 102 can be similar to the system described in U.S. Pat. No. 11,746,860, the contents of which are hereby incorporated by reference in their entirety.

As the drive system withdraws belt or pays belt out to the driven system 108, that belt travels through a series of articulating joints 104 and compression tubes 106, which work in concert to adapt to changing geometry between the driven system 108 and the drive system 102, without changing the path length of the belt or imparting significant tension changes in the belt within either the drive system 102 or the driven system 108.

The articulating joints 104 each provide at least one degree of freedom of motion by allowing for varying bend angles around their primary sheave, while maintaining the belt secure. Additionally, because the sheave translates as the belt is "wrapped" or "unwrapped" around the sheave, the overall path length through each articulating joint 104 remains unchanged. This effectively isolates the tension through the articulating joint 104 from the angle at which the belt is bent through the articulating joint 104.

The compression tubes 106 act to oppose the tension forces created by the belt as it passes around the sheave in each articulating joint 104. This ensures the path length between articulating joints 104 remains constant, aiding in maintaining constant tension as the driven system 108 moves. Further, the belt is able to twist within each compression tube 106, providing another degree of freedom for each compression tube 106 between the drive system 102 and the driven system 108. Altogether, with three articulating joints 104 and two compression tubes 106, the illustrated example transmission system 100 has five degrees of freedom for movement between the driven system 108 and the drive system 102

Together the compression tubes 106 and the articulating joints 104 behave similarly to a push-pull cable which typically has a stiff outer housing that provides compression forces and an inner cable that moves relative to the housing to effect force transmission. Unlike a push-pull cable, because the disclosed system uses sheaves on bearings, there can be very little or no internal resistance or friction between the tension member (e.g., belt) and compression members (e.g., compression tubes 106).

It should be noted that while the examples in this disclosure illustrate use with a flat belt, a cable, wire rope, or tension member of a different shape could also be used and is considered within the scope of this disclosure.

Figure 1B:
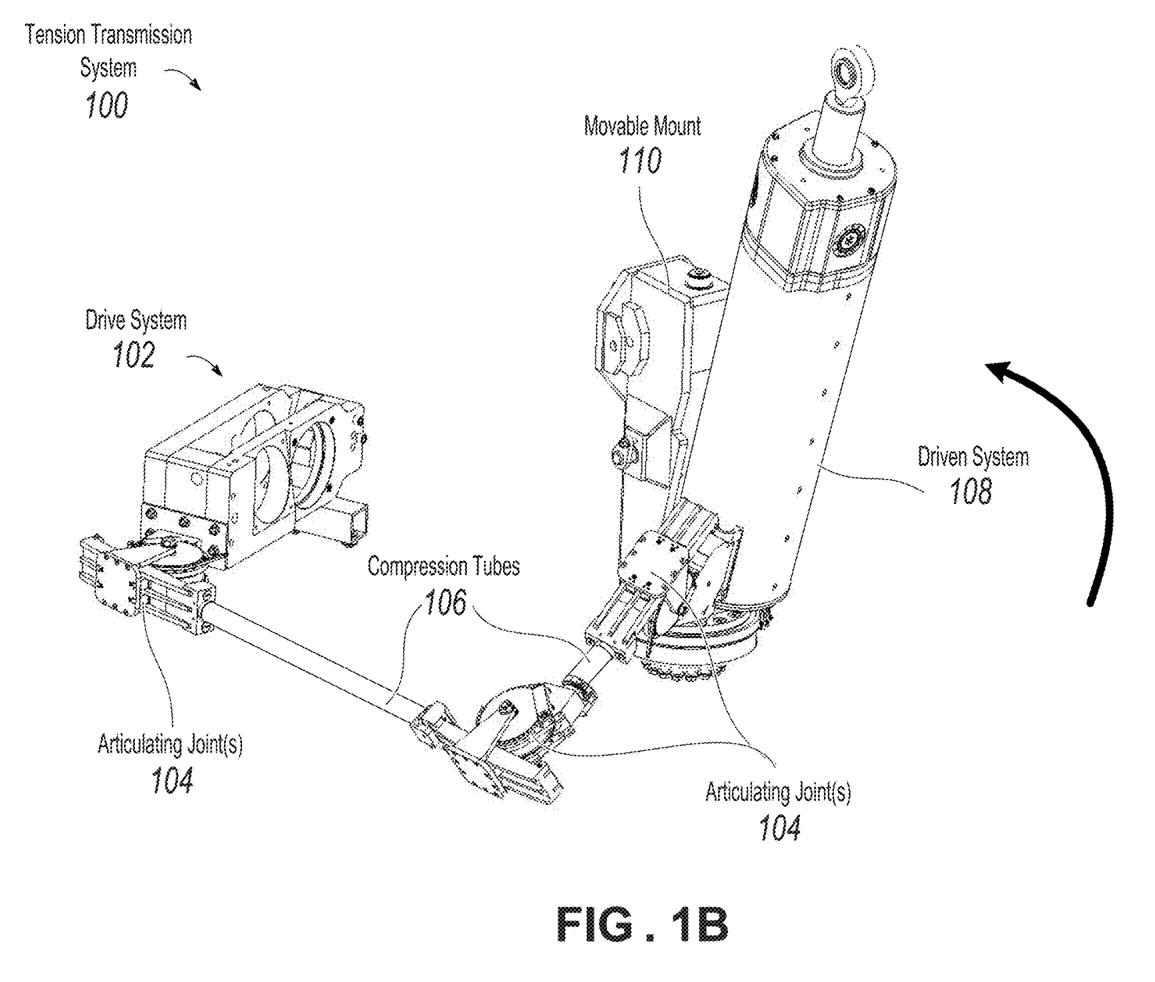
FIG. 1B illustrates the tension transmission system with a driven system in a raised position.

FIG. 1B illustrates the tension transmission system 100 with the driven system 108 in a raised position. In FIG. 1B, while the drive system 102 has remained stationary, the driven system 108 has pivoted upward on movable mount 110. To compensate, the articulating joints 104 and compression tubes 106 naturally reconfigure themselves, allowing belt from the drive system to pass freely between the drive system 102 and driven system 108 as commanded by the drive system 102.

It should be noted that the compression tubes 106 and belt they contain will be subject to the operating tension (and equivalent compression) of the driven system. For example, if the driven system 108 has a 60,000 lb (267 kN) maximum load, and an internal reduction of 10:1, the belt tension coming out of the driven system 108 during maximum load will be 6000 lbs (27 kN). In some implementations, there are different maximum loads, such as 100,000 lbs, 5000 lbs, or others.

The driven system 108 can be any suitable system that uses belt or tension force to operate. As illustrated, the driven system 108 is a belt driven linear actuator, which can use pulleys and a flat belt to operate. Similar actuators are described in U.S. Pat. No. 11,255,416 as well as U.S. patent application Ser. No. 18/436,624 and U.S. patent application Ser. No. 18/196,019 the contents of which are hereby incorporated by reference in their entirety.

Figures 2A, 2B:
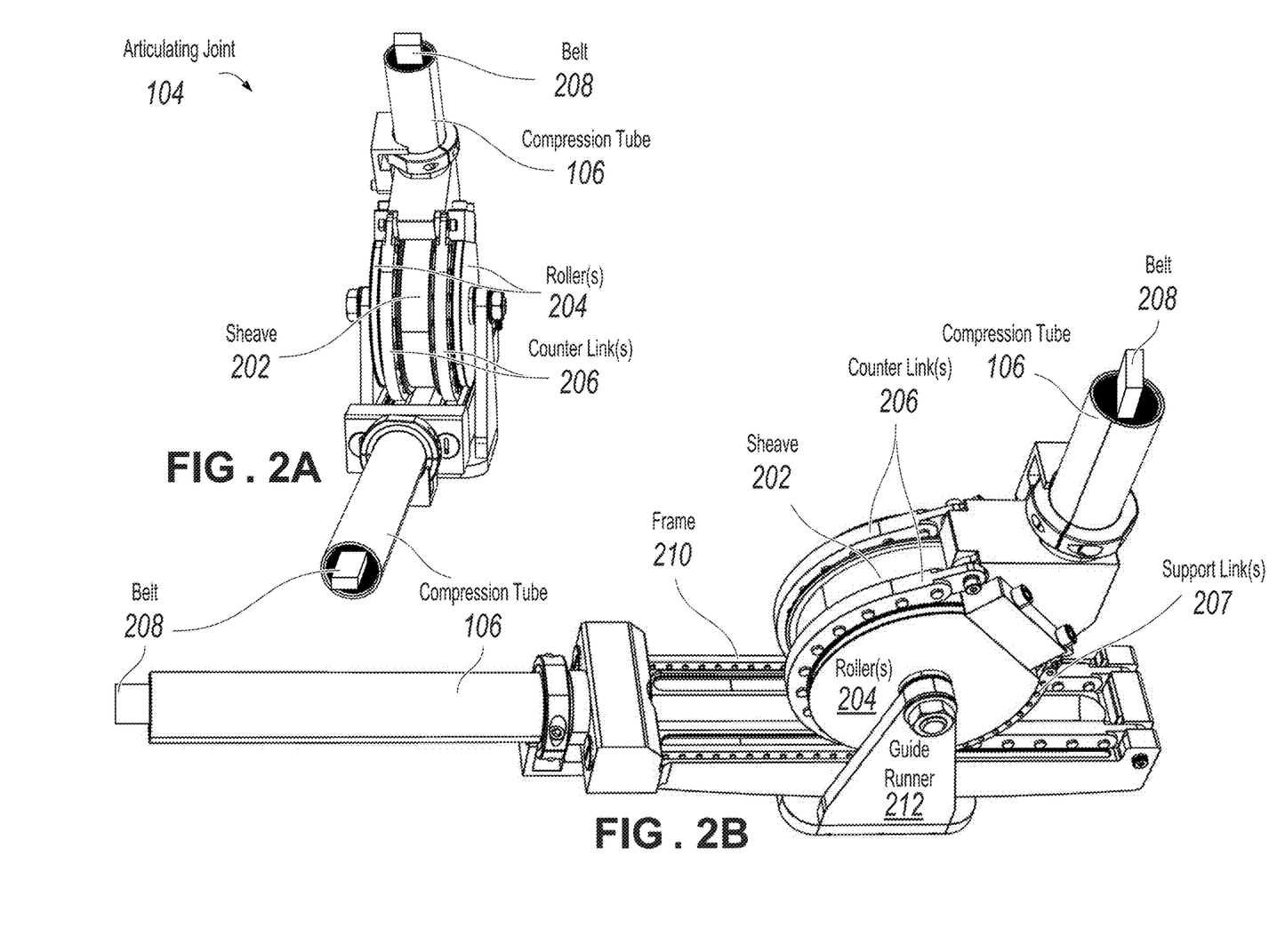
FIGS. 2A and 2B are perspective views illustrating various components in an articulating joint for the tension transmission system.

FIGS. 2A and 2B are perspective views illustrating various components in an articulating joint 104 for the tension transmission system. As shown, the belt 208 passes into the articulating joint 104 through a compression tube 106, then around the sheave 202 and out of the joint 104 through another compression tube 106.

The sheave 202 can be mounted on bearings such that it rotates freely within the articulating joint 104, and no significant friction is imparted onto or by the belt 208. On the outside of the sheave 202 are rollers 204, which engage with frame 210 and do not rotate freely. Counter links 206 are affixed to the rollers and pass around in the opposite direction of the belt 208. As the rollers 204 roll along the frame 210, the counter links 206 wrap more or less around the rollers 204 to provide force balancing within the articulating joint 104. While one end of the counter links 206 are affixed to the rollers 204, the other is affixed to the frame 210, preventing the rollers 204 from sliding along the frame, but permitting them to roll as the angle between the entry and exit of the belt 208 changes.

In some implementations, support links 207 are included, which are affixed to the rollers 204 and the frame 210 and wrap around the rollers 204 in the opposite direction of the counter links 206 and the same direction as the belt 208 passes over the sheave 202. These support links 207 can provide additional strength and solidity in the articulating joint 104, particularly in low belt tension scenarios.

In some implementations, a guide runner 212 is coupled to the rollers 204 and slides along the frame 210 while retaining the rollers 204 and the sheave 202 against the frame 210. The guide runner 212 can include a low friction surface, such as a high-density polyethylene (HDPE) or other low friction material to allow the guide runner 212 to slide along the frame 210. In some implementations, a bearing or additional roller (not shown) is included between the guide runner 212 and the frame 210 to further reduce friction and maintenance requirements.

Figure 3:
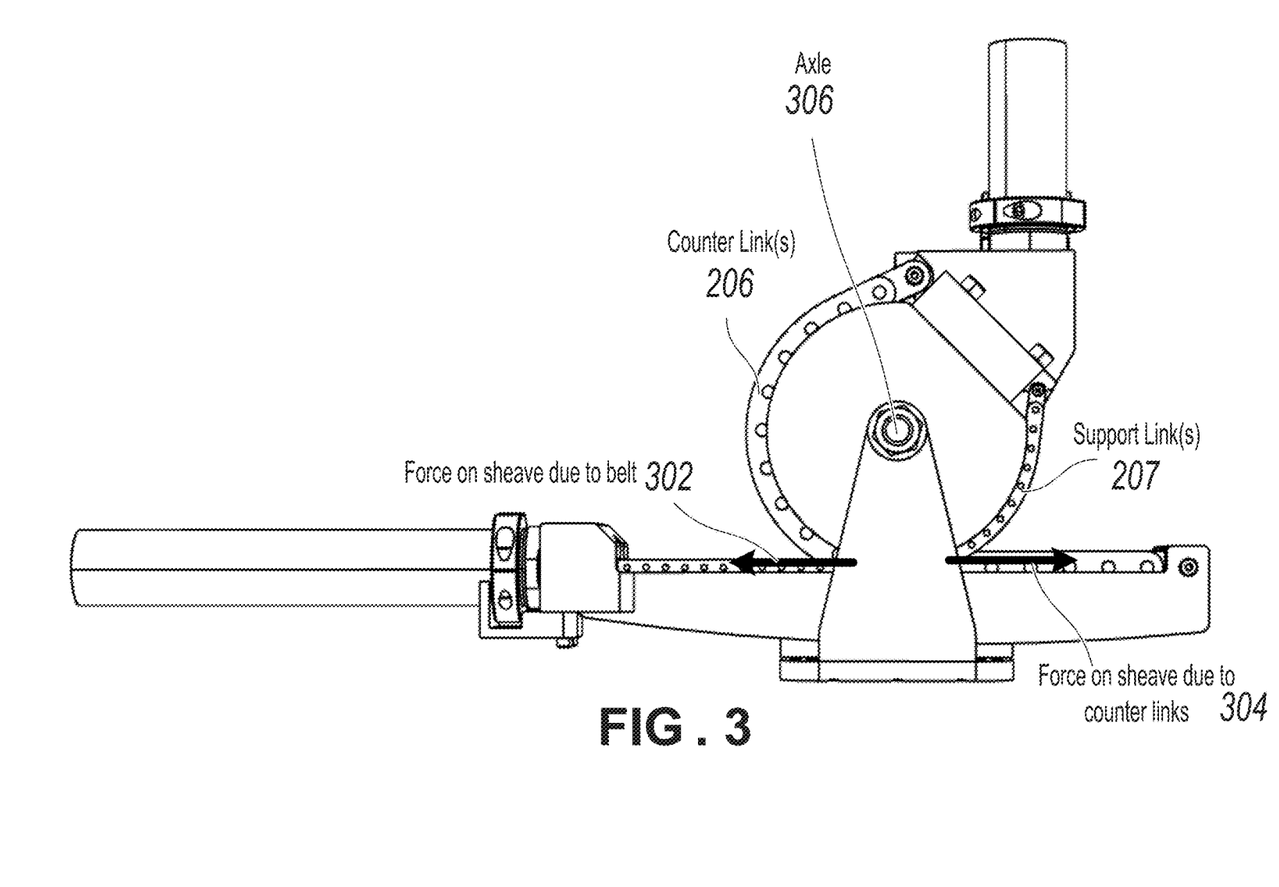
FIG. 3 is a side view of the articulating joint showing some forces generated by tension within the system.

FIG. 3 is a side view of the articulating joint 104 showing some forces generated by tension within the system. As the belt passes over the sheave, tension in the belt will tend to apply forces to the sheave as shown by force 302. This can cause a torque effect and the tendency for the sheave to move. The counter links 206, however, provide a reaction force 304 that reduces or negates the force exerted by the belt, preventing the belt tension from imparting significant work on the sheave and allowing for transmission of that tension through the articulating joint 104, independent of the angle of bend in the belt.

The axle 306 is also illustrated in FIG. 3, and it can have the rollers 204 as shown above in FIG. 2, as well as the sheave 202 and the guide runner 212 as shown above in FIG. 2 mounted to it. In some implementations, the rollers are affixed to the axle 306, and do not rotate separately from it. That is, the axle 306 rotates as the rollers roll along the frame 210 but is otherwise stationary. A bearing (not shown) mounted on the axle 306 can provide for low-friction rotation of the sheave 202 about the axle 306.

Figure 4A:
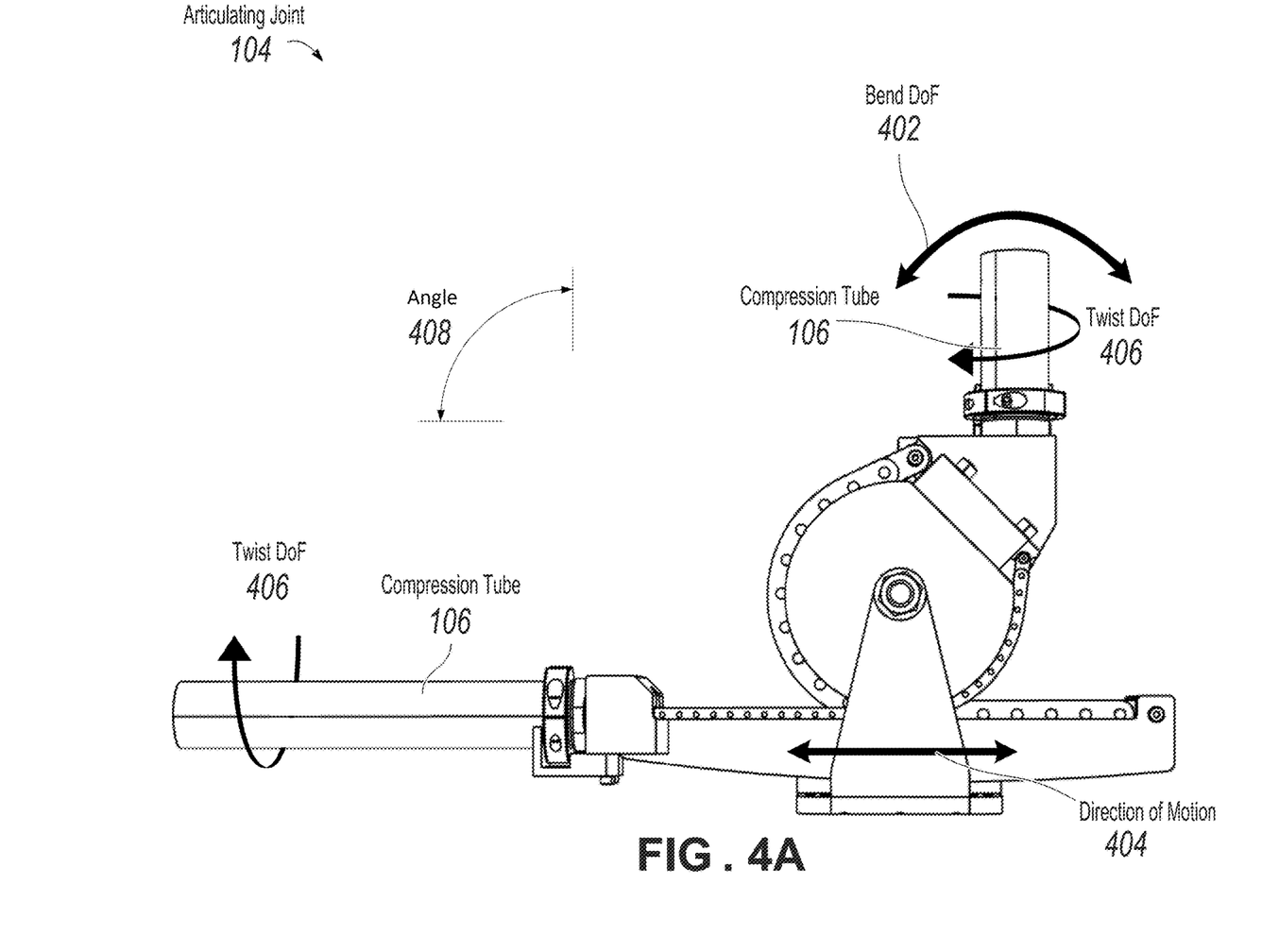
FIGS. 4A-C illustrate the articulating joint with various angles of articulation.
Figure 4B:
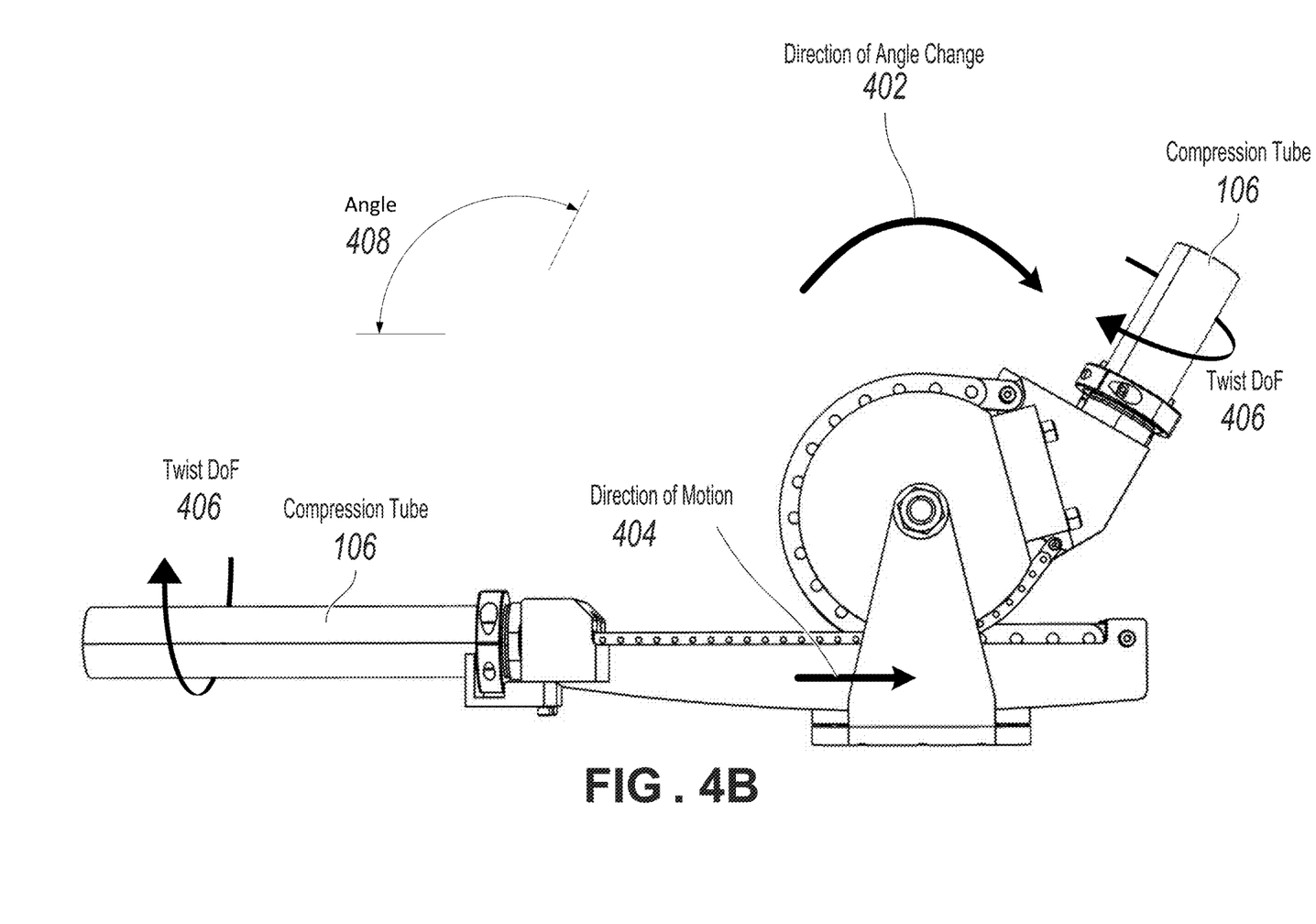
Figure 4C:
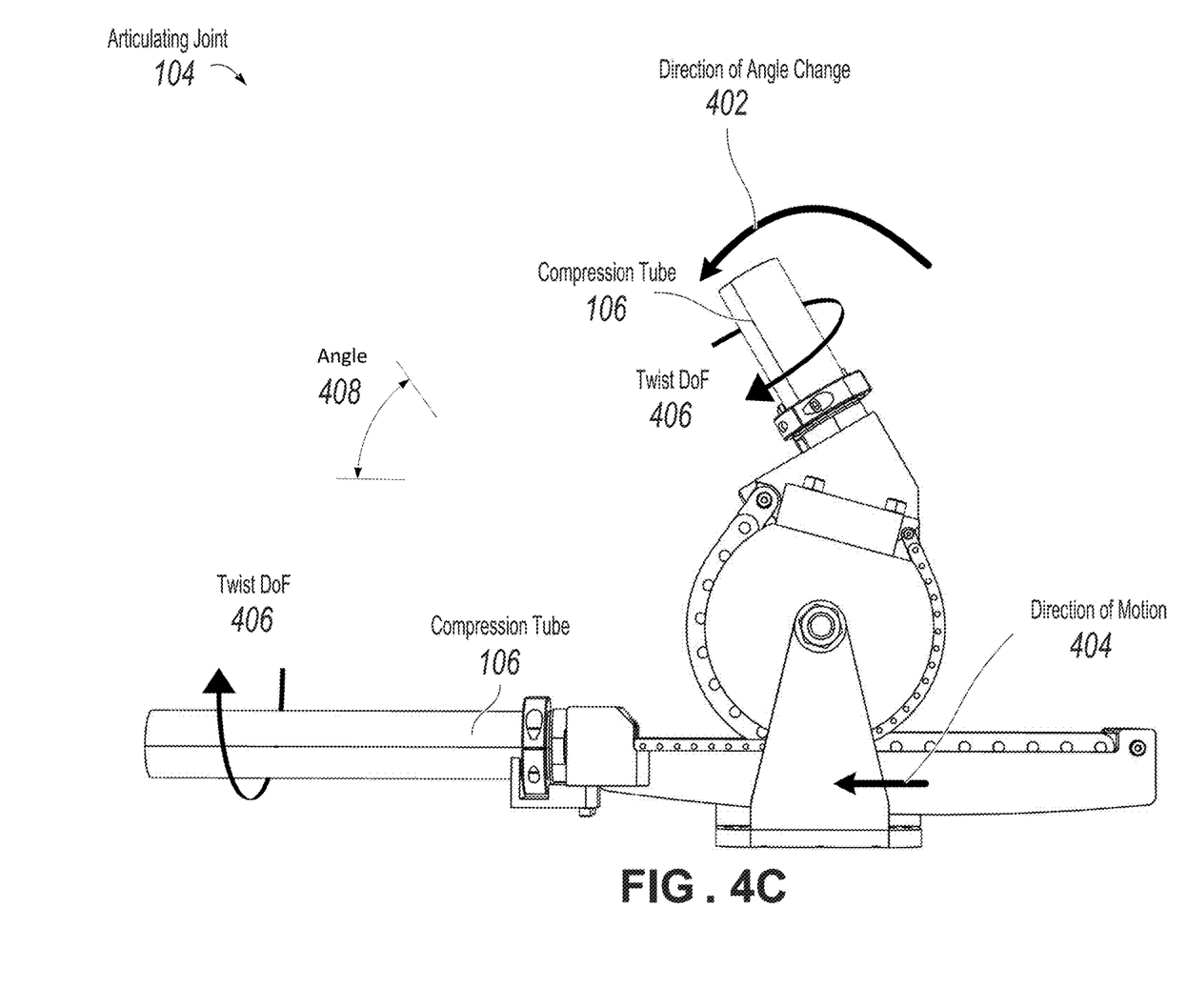

FIGS. 4A-C illustrate the articulating joint 104 with various angles of articulation. As the bend angle 408 changes, the articulating joint 104 provides a bend degree of freedom 402, and the belt will wrap further or less far around the central sheave. If the sheave were to remain stationary, there would be a longer or shorter path for the belt through the articulating joint 104. The change in belt path would result in more or less tension in the belt, and thus inadvertent actuation of the driven system (e.g., driven system 108 of FIG. 1). Therefore, to compensate, the sheave and roller translate in the direction of motion 404, in order to maintain a fixed path length through the articulating joint 104 with changing angle 408.

If the roller diameter and the sheave diameter are selected such that the bending centerline diameter of the belt 208 matches the bending centerline diameter of the counter links 206, then there will be very little torque between the moving frames, causing the joint to articulate freely and without secondary loads resulting from tension in the belt 208.

As shown in FIG. 4B, the angle 408 has increased to an obtuse angle, and as a result, the roller has rolled and the direction of motion 404 is to the right.

Similarly, in FIG. 4C the angle 408 is acute, and direction of motion 404 is to the left.

Figure 5:
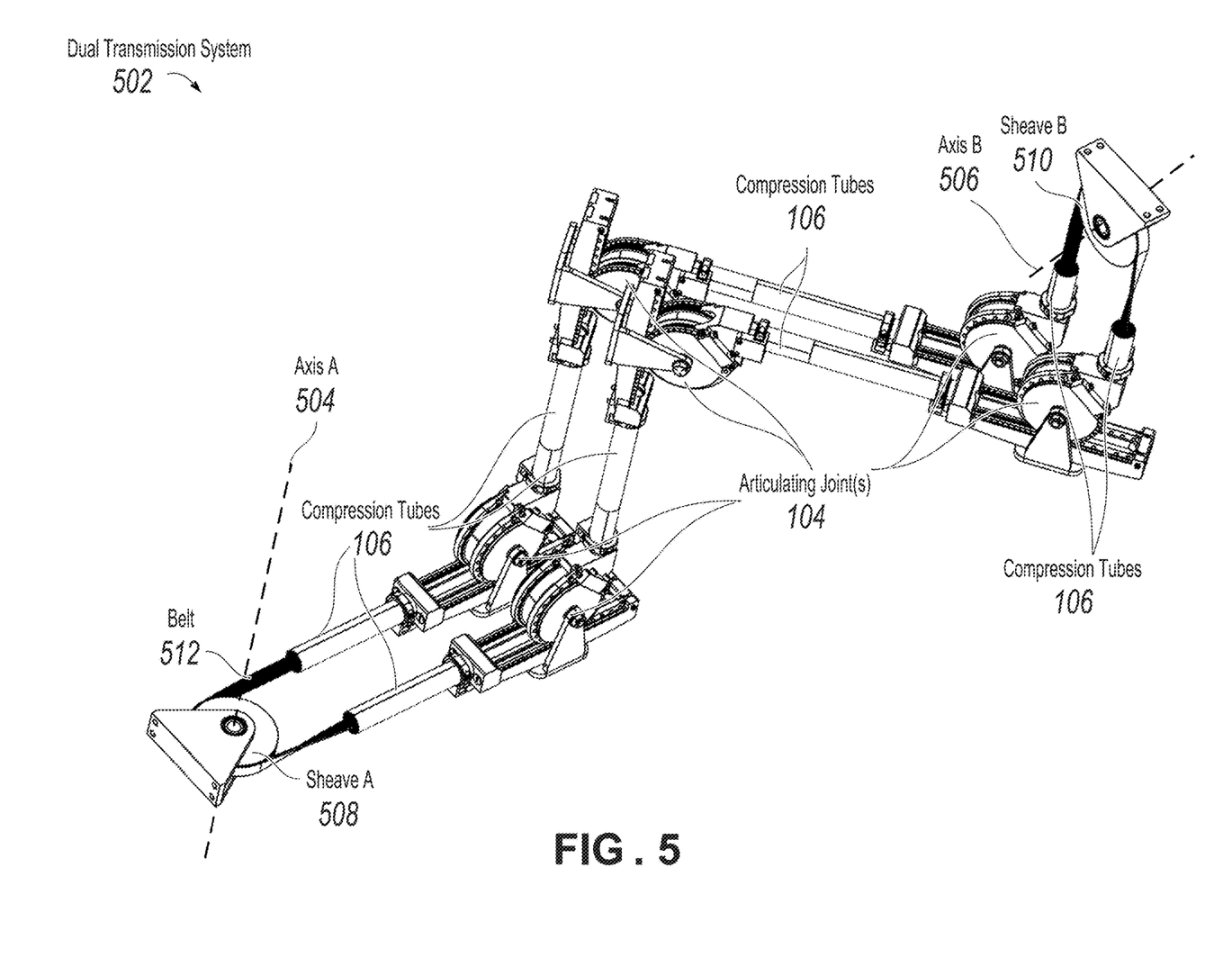
FIG. 5 illustrates an example dual transmission system enabling dynamic rotational transmission.

FIG. 5 illustrates an example dual transmission system 502 enabling dynamic rotational transmission. In some implementations it may be desirable to use a belt system to transmit rotational power, timing, synchronization, or alignment, as well as tension, across a distance or between systems with varying geometry. Transmitting rotation using a belt and sheaves can provide a lighter weight, more efficient solution than comparable gears and shafts, while also providing increased flexibility.

The dual transmission system 502 includes a pair of transmission systems having articulating joints 104 and compression tubes 106, as described above with reference to FIGS. 1-4. A continuous belt 512 extends around sheave A 508, through the dual transmission system 502, and around sheave B 510. Sheave A 508 rotates about axis A 504, and sheave B 510 rotates about axis B 506. In this configuration, axis A 504 and sheave A 508 can move relative to axis B 506 and sheave B 510 without a changing tension in the belt 512, or otherwise communicating any rotational movement to the sheaves 508 and 510 based on movement (e.g., translation) of the axes 504 and 506.

One of the sheaves, for example, sheave A 508 can be powered or driven by a mechanical system. The rotational force is transferred through the belt 512 to sheave B 510. If axis B 506 and sheave B 510 move relative to axis A 504, the rotational force transmitted through the belt 512 remains unchanged. This enables transmission of rotational power between distinct reference frames without a need to compensate for changing geometry between those reference frames.

While illustrated as to adjacent drive transmission systems, the dual transmission system 502 can take various forms. For example, the outgoing and incoming legs of the transmission system can be located separate from each other. Such as on opposite sides of a machine, or one above, and one below said machine. While the illustrated example includes three articulating joints 104 per leg, some implementations may have more or fewer articulated joints 104. For example, one leg may have five articulated joints while the return leg only has two, depending on the required mobility or flexibility in the system.

In some implementations, fewer compression tubes are possible. For example, both the outgoing and the incoming leg can be contained within a single compression tube between each pair of articulating joints. That is, there can be a single compression tube on either side of each pair of articulating joints, which can abut each other. In some implementations, a single leg (e.g., the outgoing leg, or the high-tension leg) includes compression tubes, while a return leg or low-tension leg uses conventional pulleys and free spans of belt.

In some implementations, the continuous belt 512 is used to transmit timing information or synchronization information, for example, to actuate valves or drive a cam shaft in synchronicity with a different component in a different reference frame of the same machine. In some implementations, the belt 512 delivers both significant torque or rotational power, as well as alignment or positional control simultaneously.

To help a person skilled in the art better understand the technical solutions in the present specification, the following clearly and comprehensively describes the technical solutions in the implementations of the present specification with reference to the accompanying drawings in the implementations of the present specification. Apparently, the described implementations are merely some rather than all of the implementations of the present specification. All other implementations obtained by a person of ordinary skill in the art based on one or more implementations of the present specification without creative efforts shall fall within the protection scope of the implementations of the present specification.

The foregoing description is provided in the context of one or more particular implementations. Various modifications, alterations, and permutations of the disclosed implementations can be made without departing from scope of the disclosure. Thus, the present disclosure is not intended to be limited only to the described or illustrated implementations, but is to be accorded the widest scope consistent with the principles and features disclosed herein.

The invention claimed is:

1. A joint system comprising:
a sheave configured to rotate about an axis;
a first tension member at least partially wrapped around the sheave in a first direction creating an angle between a direction of entry of the tension member onto the sheave and a direction of exit of the tension member off the sheave;
a roller mounted to the sheave and configured to roll along a frame and rotate about the axis; and
a second tension member comprising a first end and a second end, the second tension member partially wrapped around the roller in a second direction opposite the first direction, the first end affixed to the roller and the second end affixed to the frame.

2. The system of claim 1, comprising:
a first compression member extending from the frame in the direction of entry, and configured to transmit compression along a path of the first tension member; and
a second compression member extending from the roller in the direction of exit, and configured to transmit compression along a path of the first tension member.

3. The system of claim 1, wherein the roller travels along the frame as the angle created by the first tension member changes.

4. The system of claim 1, wherein a radius of the sheave and a radius of the roller are selected to minimize a change in length of the first tension member that is present within the system when the angle is changed.

5. The system of claim 1, wherein the roller is a first roller, wherein the system comprises a second roller and a third tension member affixed to the second roller and the frame, and wherein the sheave is positioned between first roller and the second roller.

6. The system of claim 1, wherein the first tension member is a flat belt.

7. The system of claim 1, comprising a fourth tension member affixed to the roller and the frame, and partially wrapping around the roller in the first direction.

8. The system of claim 1, comprising an axle upon which the roller is affixed and about which the sheave rotates.

9. The system of claim 8, comprising a guide runner coupled to the axle and configured to translate along the frame, the guide runner affixing the axle at a predetermined distance from the frame.

10. The system of claim 1, wherein the first tension member travels from a drive unit, through the joint system, and to a belt driven linear actuator.

11. A tension transmission system comprising:
two or more articulating joints, each articulating joint comprising:
a sheave configured to rotate about an axis;
a belt at least partially wrapped around the sheave in a first direction, creating an angle between a direction of entry of the belt onto the sheave and a direction of exit of the belt off the sheave;
a roller mounted to the sheave and configured to roll along a frame and rotate about the axis; and
a tension member comprising a first end and a second end, the tension member partially wrapped around the roller in a second direction opposite the first direction, the first end affixed to the roller and the second end affixed to the frame;
a drive system configured to pay out or withdraw length of the belt; and
a belt driven system, wherein the belt runs from the drive system, through two or more articulating joints, and to the belt driven system.

12. The system of claim 11, wherein each articulating joint provides a first degree of freedom based on changing the angle, and a second degree of freedom based on twisting the belt before entry into the sheave.

13. The system of claim 11, comprising three articulating joints.

14. The system of claim 11, wherein a first articulating joint of the two or more articulating joints is mounted to the drive system, and includes a first compression member extending from the frame of the first articulating joint to the frame of a second articulating joint of the two or more articulating joints, wherein the second articulating joint includes a second compression member extending from the roller of the second articulating joint to the frame of a third articulating joint of the two or more articulating joints, and wherein the third articulating joint is mounted to the belt driven system.

15. The system of claim 14, wherein the second articulating joint is rotatably coupled to the first and second compression members.

16. The system of claim 11, wherein the belt is a flat belt rated to transmit at least 27 kN of tension between the drive system and the belt driven system.

17. The system of claim 11, wherein the drive system and the belt driven system are configured to move relative to one another.

18. The system of claim 11, wherein each articulating joint comprises:
a guide runner coupled to an axle and configured to translate along the frame, the guide runner affixing the axle at a predetermined distance from the frame, and the sheave and roller mounted to the axle.

19. The system of claim 11, wherein the belt continues from the driven system, through two or more additional articulating joints and returns to the drive system, wherein the belt forms a continuous loop.

20. The system of claim 19, wherein the two or more articulating joints and the two or more additional articulating joints form a dual transmission system, and wherein the belt transmits rotational power between the drive system and the driven system.

* * * * *

UNITED STATES PATENT AND TRADEMARK OFFICE
CERTIFICATE OF CORRECTION

| | | |
|---|---|---|
| PATENT NO. | : 12,410,852 B1 | Page 1 of 1 |
| APPLICATION NO. | : 19/176481 | |
| DATED | : September 9, 2025 | |
| INVENTOR(S) | : Blake Sessions et al. | |

It is certified that error appears in the above-identified patent and that said Letters Patent is hereby corrected as shown below:

In the Specification

Column 1, Line 1, after "entirety" insert -- . --.

Signed and Sealed this
Twenty-first Day of October, 2025

John A. Squires
*Director of the United States Patent and Trademark Office*